Dec. 12, 1944.   D. G. C. LUCK   2,364,731
RADIO NAVIGATION
Filed April 1, 1942   2 Sheets-Sheet 1
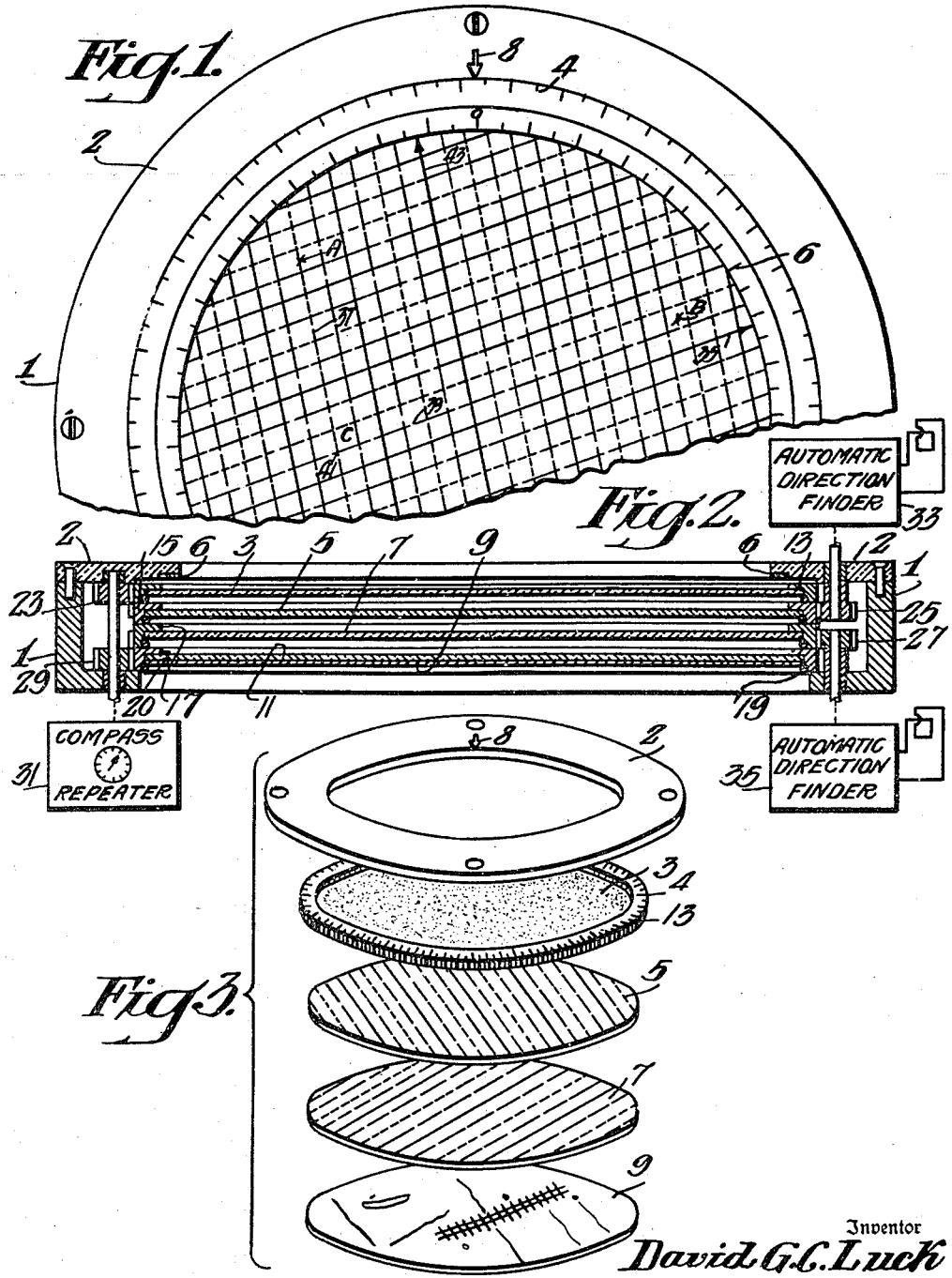
Inventor
David G.C.Luck
By C.D.Tuska
Attorney

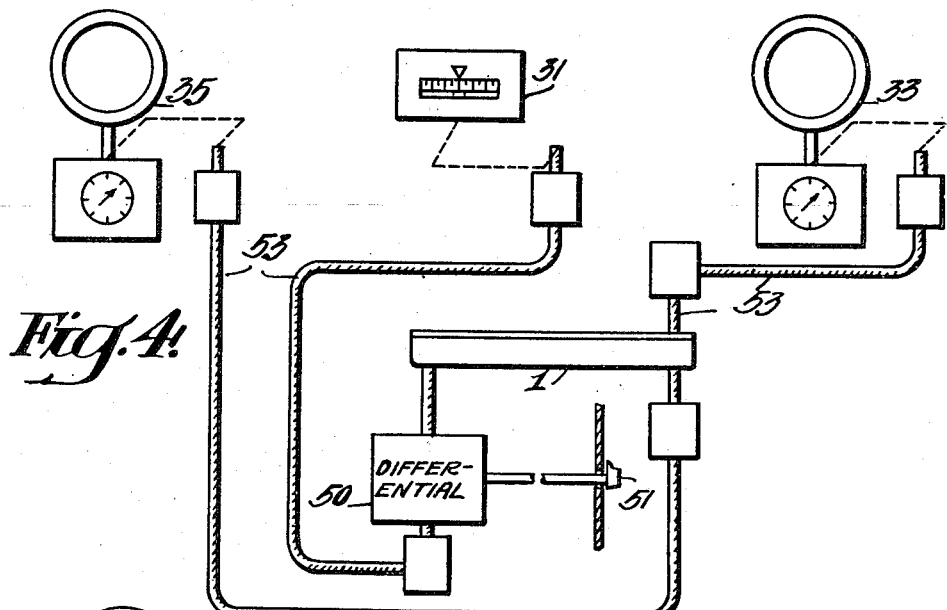
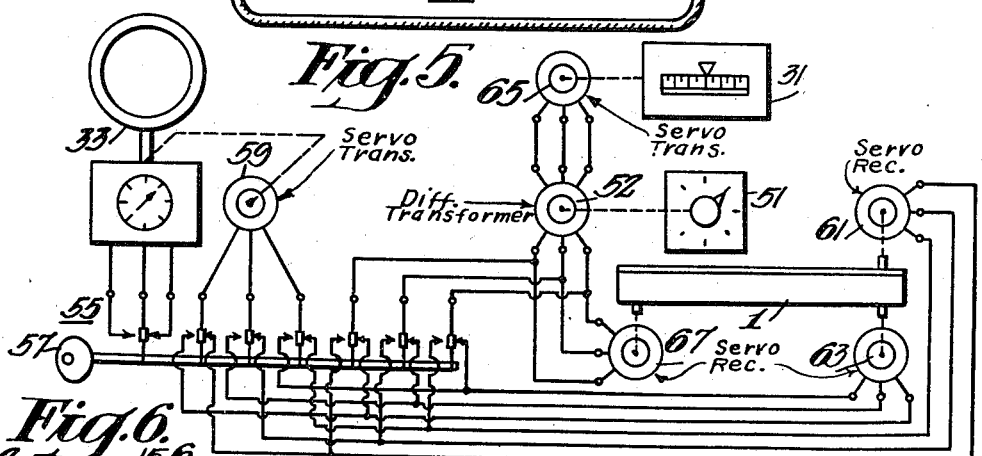
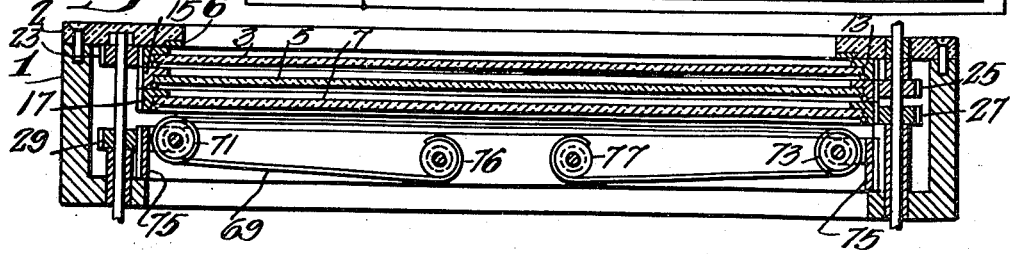

Patented Dec. 12, 1944

2,364,731

UNITED STATES PATENT OFFICE 2,364,731

RADIO NAVIGATION

David G. C. Luck, Merchantville, N. J., assignor to Radio Corporation of America, a corporation of Delaware Application April 1, 1942, Serial No. 437,184

4 Claims. (Cl. 250—11)

This invention relates to radio navigation, and more particularly to the automatic indication on a map of the position of a mobile craft. In general, devices for automatic position plotting by radio require more or less complicated mechanisms involving rotatable pointers for laying down lines of position over a map, and means for transmitting motion to the pointers without interfering with the placement of their axis of rotation coincident with the map representations of the radio stations from which bearings are taken to control the pointers. An alternative, also complicated, is the use of a large number of special maps drawn to fit the radio station positions to fixed pointer axes.

The principal object of this invention is the provision of an automatic radio position plotting device which is simple in construction and requires no special maps. The actuating devices for the plotting mechanism are two self orienting radio compasses and a repeating magnetic or gyro compass, all preferably having automatic correction of quadrantal and other instrumental errors. Throughout this specification and in the appended claims, the term "earth compass" will be used generically to mean any compass tending to maintain itself in a definite alignment with respect to the surface of the earth.

The invention will be described with reference to the accompanying drawings, in which Fig. 1 illustrates a plan view of the face of the plotting mechanism; Fig. 2 is a sectional elevation of the plotting mechanism, with schematic illustrations of the actuating devices and their connections to the plotting mechanism; Fig. 3 is an exploded perspective view of parts of the plotting mechanism; Fig. 4 is a schematic diagram of one organization of the invention; Fig. 5 illustrates a modified arrangement of the organization of the invention; and Fig. 6 is a sectional view of a modified form of the plotting mechanism shown in Fig. 2.

Referring to Fig. 2, a plurality of transparent circular disc members 3, 5, 7 and 9 are supported coaxially within a cylindrical housing 1 upon a series of ring-shaped members 13, 15, 17 and 19 respectively which are provided on their outer peripheries with gear teeth engaged by pinions 23, 25, 27 and 29, respectively. The disc 3 is preferably lightly ground or frosted on its upper surface to enable pencilled notations to be made upon it and yet allow a clear view through it of the lower discs. The discs 5 and 7 (see Fig. 3) are each ruled with a series of parallel lines, which may be colored, for example, red on the disc 5 and blue on the disc 7. The lines on each disc are made readily distinguishable from each other by the use of different types of lines, such as solid, dash, and dot, so that the eye will be less likely to become confused and jump from one parallel line to another in attempting to follow a selected line. The lowest ring, 19, carries a disk 11 and supports a circular section 9 of a map which may conveniently be a disc of the proper size cut out of an ordinary sectional aeronautical chart, such as may be purchased from the U. S. Coast and Geodetic Survey.

The disk 11 may be hinged or otherwise removably secured within the ring 19, and when in place it holds the map 9 against an internal flange 20 on the ring 19. An inwardly extending projection may be provided on the inner surface of the ring 19 to engage a corresponding cut-out in the periphery of the map to insure accurate map orientation.

The rings 13 and 19, supporting the frosted disc and the map disk respectively are connected to be driven together by pinions 23 and 29 which are secured to a shaft connected to a repeater compass or directional gyro repeater 31. Preferably the device 31 is of a type which automatically corrects itself from deviations which result from precession or other causes.

Magnetic declination, if present in the earth compass indications, may be compensated by suitably displacing the positioning cut-out in the map; if the map section is large enough to admit a considerable range in declination, a differential 50 (Fig. 4) driven by a knob 51 bearing a declination scale may be interposed in the map drive and the value corresponding to the approximate position of the craft may be set in manually. The ruled discs 5 and 7 are connected through the pinions 25 and 27 respectively to shafts which are positioned by automatic self orienting radio direction finders 33 and 35 respectively.

Referring to Fig. 4, the drives may be by flexible shafts, Selsyn motors, or any other remote drive generally indicated at 53, capable of insuring exact correspondence between motions of separated parts. However it is preferable that the drive should be of a type which operates only from transmitter to receiver, i. e., does not load the controlling member.

The housing 1 is provided with an annular cover 2 made of some transparent material and provided on its lower surface with a scale 6. A fixed index such as an arrow 8 is engraved or otherwise marked in the lower surface of the cover 2 opposite the zero line of the scale 6. The top surface of the ring 13 is provided with a circular scale 4 which is visible through the transparent cover 2 against the index 8 to afford an indication of the position of the disc 3 and the map disk 11 with respect to the body of the instrument.

The operation of the device is as follows: The disc-like map section representing an area including two radio transmitters of which the locations are known, and the position of the craft carrying the device of the invention, is secured to the ring 19 as described above, in a position with respect to the ring 19 such that the operation of the repeater compass will maintain the map in alignment with the terrain to which it corresponds. The known locations of the radio transmitters to be used are then noted upon the map, and may be conveniently indicated by inscribing pencilled crosses or other insignia on the frosted surface of the disk 3, over the station positions as represented on the map, as indicated in Fig. 1 at A and B. These insignia may if desired be made in colors corresponding to the colors of the lines on the respective discs 5 and 7. The receivers of the self orienting direction finders 33 and 35 are then tuned to the respective transmitter frequencies, whereupon the discs 5 and 7 will be rotated automatically to positions in which the lines ruled on their surfaces will be parallel to the directions of arrival of the signals from the respective transmitters. The location of the receiver upon the map is then simply a matter of following the corresponding lines on the discs 5 and 7 lying nearest the location of the stations A and B to their point of intersection. Thus, in Fig. 1, the position C is found slightly above and to the right of the intersection 41 of lines 37 and 39. Since the position of the cover 2 of the plotting device is stationary with respect to the body of the craft on which it is carried, the direction in which the craft is headed may be read from the scale 4, which rotates with the map, against the index 8. Each of the central lines 35 and 43 and the discs 5 and 7, respectively, is distinguished by an arrowhead which will point toward the station being picked up by the corresponding direction finder. The bearings of the radio transmitters with respect to the heading of the ship may be read from the stationary scale 6 against the indices 43 and 35.

To avoid the cost and the weight and space requirements of two radio direction finders, recourse may be had to one unit capable of being pretuned to two stations, and periodically switched to respond alternately to each of them as disclosed in D. G. C. Luck's U. S. Patent 2,296,041, which issued on September 15, 1942 and is assigned to the same assignee as the instant application. The switching may be accompanied by actuation of clutches to shift the direction finder drive from one ruled disc to the other in synchronism with the switching of the tuning. In this way, each station bearing controls its corresponding disc, but only for a portion of the time. To provide the necessary uniqueness of shaft position, the clutches, which may be actuated, for example, by magnetic or pneumatic means, must be arranged to engage in only one position. If the shafts are connected by gears to their respective discs, means must be provided to insure that the discs do not get out of step with the bearings by an angle corresponding to an integral multiple of the gear ratio. If a servo type drive, or a Selsyn system is used, no clutches are required, since the control may be secured by energizing and deenergizing the driving units. Each disc, during the time it is not controlled by the radio direction finder, should be controlled by the earth compass, to avoid erroneous indication due to drifting of an uncontrolled disc during turning of the craft.

Such an arrangement is illustrated in Fig. 5. The tuning of the self orienting direction finder 33 is rhythmically switched from one to the other of two preselected frequencies by a set of contacts on a multiple pole switch 55 which is periodically operated by means such as a motor driven cam 57. A servo transmitter 59 is controlled by the direction finder 33 and switched in synchronism with the tuning switching from one to the other of a pair of servo receivers 61 and 63, which are connected to the reticulated discs 5 and 7 respectively of the plotting mechanism. The compass repeater 31 is connected to control a servo transmitter 65 which is connected through a differential transformer 52 or the like to a servo receiver 67, which in turn drives the map carrying member of the plotting device. The transmitter 65 is also connected to the servo receiver 61 or 63 which is disconnected from the transmitter 59.

A modified form of plotting device is illustrated in Fig. 6. The map is prepared in the form of a long strip 69 bearing consecutive overlapping representations of the area over which the device is to be operated. The map strip is supported between a pair of rollers 71 and 73, which are mounted in a rotatable ring 75 connected to be driven by a compass repeater. The strip is wound on a pair of rollers 76 and 77, which may be connected with knobs to enable the strip 69 to be rolled from one to the other.

Thus the invention has been described as a device for plotting automatically the position of a mobile craft upon a map carried by the craft. This is accomplished by positioning a map in alignment with the corresponding terrain by means of a repeating compass, and positioning a pair of reticulated transparent members over the map in accordance with radio bearings on stations of known locations by means of self-orienting direction finders.

I claim as my invention:

1. An automatic direct indicating radio position finder including an earth compass, repeater means controlled by said earth compass, a rotatable map support positioned by said repeater means in accordance with the indications of said compass, a self-orienting radio direction finder and repeater means controlled by said radio direction finder, a plurality of reticulated transparent members supported coaxially and rotatably above said map support and arranged to be positioned by said direction finder controlled repeater means, means for tuning said direction finder alternately to the frequencies of radio transmitters of known locations, and synchronously connecting said repeater means to control successively corresponding reticulated members, and means for connecting said earth compass repeater means to control each of said reticulated members when not subject to control by said radio direction finder, whereby the positions of said reticulated members over a map placed on said map support presents a visual indication of the position of said radio direction finder, with respect to the positions of the radio transmitters to which it is responsive.

2. An automatic direct indicating radio position finder comprising a rotatable map supporting member in the form of a ring carrying parallel transversely disposed map supporting rollers arranged to display a selected portion of a map in the form of a strip adapted to be connected at its ends to two of said rollers and manually operable knobs connected to said two rollers, a repeating compass connected to said map supporting member whereby said member is maintained in a constant alignment with respect to the surface of the earth, self orienting radio compass means selectively responsive to a pair of radio transmitters, and a pair of transparent reticulated members rotatably supported over said map supporting member and connected to said self orienting radio compass means whereby each of said reticulated members is maintained in a constant alignment with respect to the respective bearings of said pair of radio transmitting stations.

3. An automatic direct indicating position finder including an earth compass, repeater means controlled by said earth compass, a rotatable map support positioned by said repeater means in accordance with the indications of said compass, a self orienting radio direction finder and repeater means controlled by said radio direction finder, a plurality of reticulated transparent members supported coaxially and rotatably by said map support and arranged to be positioned by said direction finder controlled repeater means, means for tuning said direction finder alternately to the frequencies of radio transmitters of known locations and synchronously connecting said repeater means to control successively corresponding reticulated members, whereby the positions of said reticulated members over a map placed on said map support presents a visual indication of the position of said radio direction finder with respect to the positions of the radio transmitters to which it is tuned.

4. A direct indicating radio position finder including a rotatable ring shaped map-supporting member carrying parallel rollers arranged to display a selected portion of a map in the form of a strip adapted to be connected at its ends to two of said rollers, manually operable knobs connected to said two rollers, a repeating compass connected to said map-supporting member, to maintain said supporting member in constant alignment with respect to the surface of the earth, self orienting radio compass means selectively responsive to a pair of radio transmitters, and a pair of transparent reticulated members rotatably supported over said map-supporting member and connected to said radio compass means to maintain each of said reticulated means in a constant alignment with respect to the respective bearings of said selected pair of radio transmitters.

DAVID G. C. LUCK.